(12) United States Patent
Sehgal et al.

(10) Patent No.: US 11,497,210 B2
(45) Date of Patent: *Nov. 15, 2022

(54) COMPOSITIONS AND METHODS FOR LONG LASTING DISINFECTION

(71) Applicant: RHODIA OPERATIONS, Paris (FR)

(72) Inventors: Amit Sehgal, Potomac, MD (US); Thomas Brophy, Allentown, NJ (US); Kamel Ramdani, Princeton, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,685

(22) Filed: Apr. 9, 2019

(65) Prior Publication Data

US 2019/0307124 A1   Oct. 10, 2019

Related U.S. Application Data

(60) Provisional application No. 62/654,652, filed on Apr. 9, 2018.

(51) Int. Cl.
*A01N 25/10* (2006.01)
*A01N 25/30* (2006.01)
*A01N 33/12* (2006.01)

(52) U.S. Cl.
CPC ............ *A01N 33/12* (2013.01); *A01N 25/30* (2013.01)

(58) Field of Classification Search
CPC ................................ A01N 25/30; A01N 33/12
See application file for complete search history.

(56) References Cited

U.S. PATENT DOCUMENTS

| 4,287,080 | A | 9/1981 | Siklosi |
| 4,470,923 | A | 9/1984 | Koster |
| 4,547,571 | A | 10/1985 | Mukohyama et al. |
| 6,383,344 | B1 | 5/2002 | Miller et al. |
| 6,833,347 | B1 | 12/2004 | Wang et al. |
| 7,119,055 | B2 * | 10/2006 | Cheung .................. C11D 3/042 510/418 |
| 7,259,192 | B2 | 8/2007 | Liu et al. |
| 2003/0114342 | A1 * | 6/2003 | Hall ....................... A01N 33/12 510/391 |
| 2008/0249136 | A1 | 10/2008 | Annis et al. |
| 2016/0058012 | A1 | 3/2016 | Herdt et al. |
| 2016/0143275 | A1 | 5/2016 | Lan et al. |
| 2016/0143276 | A1 | 5/2016 | Lan et al. |
| 2016/0235848 | A1 | 8/2016 | Scholz |
| 2016/0262382 | A1 | 9/2016 | Lan et al. |
| 2016/0262383 | A1 | 9/2016 | Lan et al. |
| 2017/0280716 | A1 | 10/2017 | Lan et al. |

FOREIGN PATENT DOCUMENTS

| EP | 3 263 687 | * | 3/2018 |
| WO | 2016086014 A1 | | 6/2016 |
| WO | 2016101980 A1 | | 6/2016 |
| WO | WO 2016/101980 | * | 6/2016 |

OTHER PUBLICATIONS

P. Nechita, et al., Antimicrobial Coatings based on Chitosan Derivatives and Quaternary Ammonium Salts for Packaging Paper Applications, Cellulose Chem. Technol., 49 (7-8), 625-632 (2015).

* cited by examiner

*Primary Examiner* — Shirley V Gembeh
(74) *Attorney, Agent, or Firm* — Jarrod N. Raphael; Sarah Klosek

(57) ABSTRACT

An antimicrobial composition that includes: an antimicrobial component having at least one quaternary ammonium compound; a cationic polysaccharide; an organic acid; and a surfactant selected from cationic surfactants, amphoteric surfactants, nonionic surfactants and combinations thereof. This composition when applied to a surface provides robust long lasting disinfection.

14 Claims, 1 Drawing Sheet

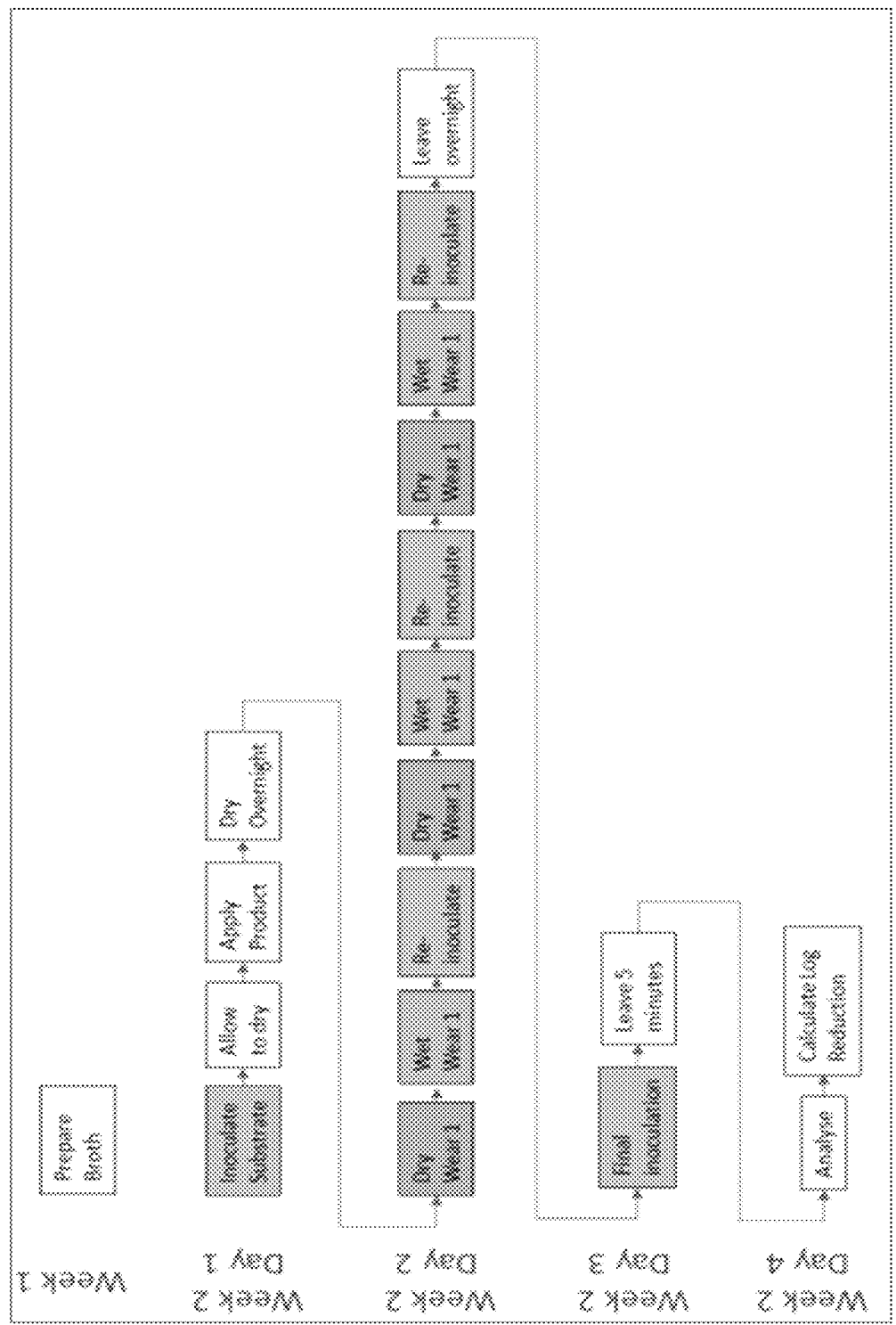

COMPOSITIONS AND METHODS FOR LONG LASTING DISINFECTION

CROSS-REFERENCE TO RELATED APPLICATION

The present application claims the benefit of priority under 35 U.S.C. § 119(e) of U.S. Provisional Application Ser. No. 62/654,652, filed on Apr. 9, 2018, the entire disclosure of which is incorporated herein by reference.

BACKGROUND

It is often desirable to provide a biocidal surface on which microorganisms, many of which are potentially harmful, cannot survive at least for a given period of time. Most materials have surfaces that do not normally prevent microbial contamination. One useful way to improve the microorganism resistance of a surface is to treat the surface with a formulation that provides a biocidal effect and also prevents future growth until the next application.

One common method of treating a surface is to apply a layer of a liquid formulation to that surface and then dry the layer or allow the layer to dry. It is desirable that such liquid formulations are clear and remain stable during storage. It is also desirable that such liquid formulations spread evenly when applied to a hard, flat surface. It is desirable that such films, when dry, have one or more of the following desirable properties: clarity, non-tackiness; durability to repeated touching or wiping; no long term build-up; and ability to maintain biocidal efficacy under normal use for an extended period of time after application to a surface.

Antimicrobial compositions commercially available as disinfectants, or as cleaners with disinfecting activity, typically achieve microbial kill at 99.9% or greater. However, re-soiling or contamination of the surface requires additional treatments with such compositions. A need, therefore, exists for antimicrobial formulations that provide high microbial kill without the need for repeated applications. However, designing compositions that meet the above requirements is a difficult task in view of unpredictable and complicated interactions between ingredients.

BRIEF DESCRIPTION OF THE DRAWINGS

FIG. 1 is flow chart depicting the RSS-12 h analysis conducted in the Examples.

SUMMARY

The present disclosure provides hard surface treatment compositions comprising: an antimicrobial component comprising at least one quaternary ammonium compound; a cationic polysaccharide derived from a natural source; an organic acid; and a surfactant selected from cationic surfactants, amphoteric surfactants, nonionic surfactants, and combinations thereof. Also presented are methods of providing a surface with residual antimicrobial action that include the step of applying a composition of the present disclosure to the surface. The present disclosure also provides a substrate with residual antimicrobial action comprising a substrate wherein at least a portion of the substrate is coated with a composition of the present disclosure.

DETAILED DESCRIPTION

The present disclosure relates to compositions that provide a longer lasting disinfection to treated surfaces and include cationic polysaccharides derived from a natural source. The present compositions achieve microorganism (e.g. bacterial, viral, or fungal) kill of at least 95% or greater, (e.g. 99.9% kill), for 12 to 24 hours obviating the need for repeated treatment. Suitable techniques for assessing the effectiveness of compositions of the present disclosure include U.S. and European standard methods.

In order to substantiate 24 hour long-term sanitization claims with the United States Environmental Protection Agency (EPA), compositions are evaluated with the residual self-sanitization (RSS) method, EPA Protocol #01-1A (https://www.epa.gov/sites/production/files/2015-09/documents/cloroxpcol_final.pdf). For validating longer term disinfection, all extant test protocols emulate the maximum amount of recontamination and abrasion by touching and wiping anticipated before reapplication, typically a 24 hour period. An intermediate protocol with approximately half the level abrasion and re-soiling challenge to a surface is presented here as the "RSS-12 h" test protocol.

To address the need for a Standard European Test Method by which residual antimicrobial activity can be measured and assessed, the British Standard Institute has recently published BSI-PAS-2424 titled: "Quantitative surface test for the evaluation of residual antimicrobial (bactericidal and/or yeasticidal) efficacy of liquid chemical disinfectants on hard non-porous surfaces—Test method". Most methods involving testing of antimicrobial efficacy involve applying a product to a surface and leaving it for a period of time before challenging with micro-organisms. The limitation of such methods is that the surface remains undisturbed following application. In reality, a Lancaster University report: "Cleaning Behaviours in the Home" based on consumer research showed that in domestic or workplace environment, once a product has been applied to a surface, the surface is continually exposed to abrasion such as touching and wiping. This results in re-contamination of the surface before reapplication of a product, typically every 24 h. The test method BSI PAS 2424 was designed to reflect actual conditions in which a product is designed to be used.

The EPA-RSS, RSS-12 h and the BSI-PAS 2424 methods all attempt to emulate efficacy of a long-lasting disinfectant by incorporating wet and dry abrasion cycles into the testing protocol. Besides the overt similarities between the test methods there are some significant differences between RSS and PAS2424 methods. 1. Microorganisms: The number of microorganisms and types tested by the two methods are different and are listed below. EPA-RSS list is much shorter (e.g. gram +ve and gram −ve bacteria), while PAS-2424 includes four bacteria and one yeast strain. 2. The weights used for the abrasion testing are very different for the two methods besides the application geometry. The normal force applied in the EPA-RSS test method including the weight boats is 1084 g±0.2 g which is 5 times greater than the normal force applied in the BSI PAS 2424 method 210 g±2 g. 3. Abrasion cycles: The EPA-RSS method uses 6 wear cycles compared to 3 wear cycles for the BSI-PAS 2424 as in the RSS-12 h test protocol.

In an embodiment, a film formed from the composition kills at least 99.9% (e.g. log 3 reduction) of microorganisms according to the residual self-sanitizing (RSS) activity test (EPA Protocol #01-1A). In an embodiment, a film formed from the composition kills at least 99.9% (e.g. log 3 reduction) of gram-positive bacteria and gram-negative bacteria according to the residual self-sanitizing (RSS) activity test (EPA Protocol #01-1A).

Long lasting disinfection claims are substantiated by the RSS test, which challenges the applied composition by subjecting it to recontamination (re-inoculation with microorganisms) and abrasion (wear cycles). An intermediate test protocol, with approximately half the number of re-inoculations and wear cycles ("RSS-12 h") is used to predict disinfection that is durable up to 12 hours before reapplication of the test product. As outlined in FIG. 1, this procedure requires preparation of the test bacterial (microbial) culture over the first week (see EPA Protocol #01-1A) followed by testing in week 2.

The testing involves inoculating the surface with bacteria, followed by application of the product on the substrate and allowing it to dry. The substrate may be glass, polycarbonate, or steel. This substrate is then subjected to an abrasion—re-inoculation regime of 3 "wear cycles". The abrasion is conducted with a 1084 gwt. rectangular steel block covered with a cloth with an underlying thin polyurethane-foam layer. Each wear cycle is composed of a "dry" abrasion and a "wet" abrasion, the latter with the cloth cover having been wet with a mist of water using a Preval® sprayer. Each abrasion (dry/wet) is characterized by a back and forth motion of the block across the test substrate. Each abrasion cycle is followed by re-inoculation the surface with a bacterial culture. The RSS-12 h involves a 3-abrasion cycle/3-inoculations test as compared to the full RSS test that outlines a 6-abrasion cycle/6-inoculation test regimen. All other details of the test method are as outlined in the EPA Protocol #01-1A.

The test substrate is allowed to dry overnight and then finally inoculated again (sanitizer test) for 5 minutes, followed by neutralization of the entire substrate. Surviving bacteria is then harvested off the surface and cultured with serial dilutions on agar plates, allowing colony formation over 24-48 hours. Surviving bacteria are then counted as the number of colonies. The difference in bacterial count inoculated and surviving bacteria results in an efficacy evaluation in percent kill (e.g. 99.9% kill) or log-reduction (e.g. 3-log reduction) on a logarithmic scale. The bacteria in this test may be substituted for other microorganisms such as fungi or viruses. In an embodiment, microorganisms are selected from gram-positive bacteria (e.g *Staphylococcus aureus*), gram-negative bacteria (e.g. *Enterobacter aerogenes*), fungi, enveloped viruses, non-enveloped viruses, and combinations thereof.

The composition of the present disclosure is a liquid formulation. It is contemplated that one preferred method of making use of the composition of the present disclosure is to apply a layer of the composition to a substrate and dry the composition or allow it to dry. The act of applying a layer of the composition to a substrate and then drying it or allowing it to dry is known herein as "treating" the substrate. It is contemplated that, as the solvent evaporates, the composition will form a film on the substrate. The dried layer of the composition is known herein as "a film."

In an embodiment, the composition includes: an antimicrobial component that includes at least one quaternary ammonium compound; a cationic polysaccharide derived from a natural source; an organic acid; and a surfactant selected from cationic surfactants, amphoteric surfactants, nonionic surfactants, and combinations thereof.

In an embodiment, the pH of the composition ranges from about 2 to about 12. In another embodiment, the pH of the composition ranges from 3 to 10. In another embodiment, the pH of the composition ranges from 3 to 5. In yet another embodiment, the pH of the composition ranges from 4 to 9.

The antimicrobial compositions of the present disclosure include at least one quaternary ammonium compound. In an embodiment, the quaternary ammonium compound is an antimicrobial "quat." The term "quaternary ammonium compound" or "quat" generally refers to any composition with the following formula:

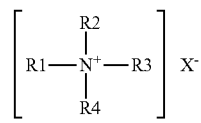

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an embodiment, groups R1, R2, R3, and R4 each have less than a C20 chain length. X⁻ is an anionic counterion. The term "anionic counterion" includes any ion that can form a salt with quaternary ammonium. Examples of suitable counterions include halides such as chlorides, bromides, fluorides, and iodides, sulphonates, propionates, methosulphates, saccharinates, ethosulphates, hydroxides, acetates, phosphates, carbonates, bicarbonates, and nitrates. In an embodiment, the anionic counterion is chloride.

In some embodiments, quaternary ammoniums having carbon chains of less than 20 or C2-C20 are included in compositions of the present disclosure. In other embodiments, quaternary ammoniums having carbon chains of C6-C18, C12-C18, C12-C16 and C6-C10 are included in compositions of the present disclosure. Examples of quaternary ammonium compounds useful in the present disclosure include, but are not limited to, alkyl dimethyl benzyl ammonium chloride, alkyl dimethyl ethylbenzyl ammonium chloride, octyl decyl dimethyl ammonium chloride, dioctyl dimethyl ammonium chloride, and didecyl dimethyl ammonium chloride. A single quaternary ammonium or a combination of more than one quaternary ammonium may be included in compositions of the present disclosure. Further examples of quaternary ammonium compounds useful in the present disclosure include, but are not limited to, benzethonium chloride, ethylbenzyl alkonium chloride, ethyl benzethonium chloride, myristyl trimethyl ammonium chloride, methyl benzethonium chloride, cetalkonium chloride, cetrimonium bromide (CTAB), carnitine, dofanium chloride, tetraethyl ammonium bromide (TEAB), domiphen bromide, benzododecinium bromide, benzoxonium chloride, choline, denatonium, and mixtures thereof.

In some embodiments depending on the nature of the R group, the anion, and the number of quaternary nitrogen atoms present, the antimicrobial quaternary ammonium compounds may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercial available under the tradenames Rhodaquat® M242C/29 and Dehyquart® A; alkyltrimethyl ammonium chloride, commercially available as Arquad® 16; alkylaryltrimethyl ammonium chloride; and cetyldimethyl ethylammonium bromide, commercially available as Ammonyx® DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Some non-limiting examples of monoalkyldimethylbenzyl ammonium salts include alkyldimethylbenzyl ammonium chlorides, commercially available as Barquat® from Lonza Inc.; and benzethonium chloride, commercially available as Lonzagard®, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC® 2125M from Stepan Company, and Barquat® 4250 from Lonza Inc. Other examples include N,N-benzyldimethyloctylammonium chloride, N,N-benzyldimethyldecylammonium chloride, N-dodecyl-N-benzyl-N,N-dimethylammonium chloride, N-tetradecyl-N-benzyl-N,N-dimethylammonium chloride, N-hexadecyl-N,N-dimethyl-N-benzylammonium chloride, N,N-dimethyl N-benzyl N-octadecyl ammonium chloride.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac® 22 from Lonza Inc.; didecyl dimethyl ammonium chloride commercially available as Bardac® 2250 from Lonza Inc.; dioctyl dimethyl ammonium chloride, commercially available as Bardac® LF and Bardac® LF-80 from Lonza Inc.; and octyl decyl dimethyl ammonium chloride sold as a mixture with didecyl and dioctyl dimethyl ammonium chlorides, commercially available as Bardac® 2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat® 6060/CPC from Zeeland Chemical Inc.; 1-[3-chloroalkyl]-3,5,7-triaza-1-azoniaadamantane, commercially available as Dowicil® 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dimethylethylbenzyl ammonium cyclohexylsulfamate.

Bis-quatemary ammonium salts contain two symmetric quaternary ammonium moieties having the general formula:

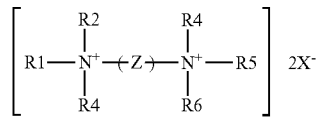

where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride] hexane or triclobisonium chloride.

In an embodiment, the quaternary ammonium compound is a medium to long chain alkyl R group, such as from 8 carbons to about 20 carbons, from 8 carbons to about 18 carbons, from about 10 to about 18 carbons, and from about 12 to about 16 carbons, and providing a soluble and good antimicrobial agent.

In an embodiment, the quaternary ammonium compound is a short dialkyl chain quaternary ammonium compound having an R group, such as from 2 carbons to about 12 carbons, from 3 carbons to about 12 carbons, or from 6 carbons to about 12 carbons.

The composition may include from about 100 to about 20,000 ppm of one or more quaternary ammonium compounds. In various embodiments, the composition includes from about 500 to about 20,000 ppm; from about 500 to about 10,000 ppm; or from about 500 to about 5000 ppm of one or more quaternary ammonium compounds.

Cationic polysaccharides for use in the present disclosure are selected from polymers having a polysaccharide backbone comprising cationic groups and are derived from a natural source. In an embodiment, the cationic polysaccharide derived from a natural source is selected from: cationic guar, cationic cellulose, and cationic starch. "Cationic" means permanently positively charged whatever the pH or non-permanently charged, e.g. a derivative that can be cationic below a given pH and amphoteric or neutral above that pH. The cationic polysaccharides can be obtained by chemically modifying natural polysaccharides. This chemical modification, also known as "derivatization", makes it possible to introduce side groups into the polysaccharide backbone. In an embodiment, the cationic groups borne by the cationic polysaccharides according to the present disclosure are quaternary ammonium groups.

Guars are polysaccharides composed of the sugars galactose and mannose. The backbone is a linear chain of β 1,4-linked mannose residues to which galactose residues are 1,6-linked at every second mannose, forming short sidebranches.

Within the context of the present disclosure, the cationic guars are cationic derivatives of guars.

In the case of the cationic polysaccharides, such as the cationic guars, the cationic group may be a quaternary ammonium group bearing 3 radicals, which may be identical or different, preferably chosen from hydrogen, alkyl, hydroxyalkyl, epoxyalkyl, alkenyl, or aryl, preferably containing 1 to 22 carbon atoms, more particularly 1 to 14 and advantageously 1 to 3 carbon atoms. The counterion is generally a halogen. One example of the halogen is chlorine.

Examples of the quaternary ammonium salts include: 3-chloro-2-hydroxypropyl trimethyl ammonium chloride (CHPTMAC), 2,3-epoxypropyl trimethyl ammonium chloride (EPTAC), diallyldimethyl ammonium chloride (DMDAAC), vinylbenzene trimethyl ammonium chloride, trimethylammonium ethyl metacrylate chloride, methacrylamidopropyltrimethyl ammonium chloride (MAPTAC), and tetraalkylammonium chloride.

One example of the cationic functional group in the cationic polysaccharides is trimethylamino(2-hydroxyl)propyl, with a counter ion. Various counter ions can be utilized, including but not limited to halides, such as chloride, fluoride, bromide, and iodide, sulfate, methylsulfate, and mixtures thereof.

In an embodiment, the cationic guars of the present disclosure are chosen from: cationic hydroxyalkyl guars, such as cationic hydroxyethyl guar (HE guar), cationic hydroxypropyl guar (HP guar), cationic hydroxybutyl guar (HB guar); and cationic carboxylalkyl guars including cationic carboxymethyl guar (CM guar), cationic carboxylpropyl guar (CP guar), cationic carboxybutyl guar (CB guar), and carboxymethylhydroxypropyl guar (CMHP guar).

In an embodiment, the cationic guars of the present disclosure are guars hydroxypropyltrimonium chloride or hydroxypropyl guar hydroxypropyltrimonium chloride.

In an embodiment, the cationic polysaccharide is a blend of cationic guar and one or more film forming water soluble polymers. In an embodiment, the film forming polymers are selected from polyvinylalcohol (PVA), polyvinylpyrrolidone (PVP), copolymers comprising PVP, chitosan, ionic polymers (e.g., anionic polymers comprising carboxylic or sulfonic acid groups and their salts where the protons are substituted, by lithium, sodium, potassium, etc), polyacrylamides.

In another embodiment, the cationic polysaccharide is a depolymerized guar. In this embodiment, the cationic guar may be prepared by depolymerizing cationically modified guars that have high molecular weight, so as to "split" the guar polymers to desired sizes. It is appreciated that the cationic guar of the present disclosure may also be prepared by depolymerization of natural guars, followed by cationization reactions to provide the polymers with cationic functionality. Various depolymerization methods are well known in the art and may be used, such as treatment by using peroxo compound (e.g., hydrogen peroxide) and irradiation. Examples of such methods are disclosed in U.S. Pat. Nos. 4,547,571, 6,383,344 and 7,259,192. The cationization of guars can be easily made by a skilled person using methods commonly known in the art. Alternatively, low molecular weight guars can be obtained by harvesting guar beans which are still at an early developmental stage such that the harvested guar beans contain low molecular weight natural guar gums. Then the guar gums may be subject to cationization to provide them with cationic functionality.

Among the cationic guar derivatives that may be mentioned are guar hydroxypropyl trimonium chloride (INCI name), for example Jaguar® C13S, C14S, or C17, Jaguar® Excel and Jaguar® C 2000 sold by Solvay or hydroxypropyl guar hydroxypropyl trimonium chloride (INCI name), for example Jaguar® C162 sold by Solvay.

In one embodiment the cationic polysaccharide is cationic cellulose. In an embodiment, the cationic cellulose is cellulose ether (e.g. hydroxyethyl cellulose and hydroxymethyl cellulose). Examples of cellulose ethers are provided in U.S. Pat. No. 6,833,347.

Cationic celluloses that could be used in the compositions of the present disclosure are celluloses modified by quaternary ammonium cationic group. In an embodiment, the quaternary ammonium group carries three radicals which are identical or different and are selected from hydrogen, alkyl radical from 1 to 10 carbon atoms (e.g. from 1 to 6 carbon atoms; from 1 to 3 carbon atoms), aryl, those three radicals being identical or different. In an embodiment, the quaternary ammonium groups are selected from trialkylammonium groups (e.g. trimethylammonium, triethylammonium, tributylammonium, aryldialkylammonium, benzyldimethylammonium) and ammonium radicals in which the nitrogen atom is a member of a cyclic structure (e.g. pyridinium and imidazoline), each in combination with a counter ion. In and embodiment, the counter ion of the quaternary ammonium group is a halogen (e.g. a chloride ion, a bromide ion or an iodide ion).

The cationic substituent on the cationic starch is the same that those described above for the cationic guar and the cationic cellulose.

In an embodiment, the cationic polysaccharide is derived from an amphoteric polysaccharide that is cationic at a lower pH. In an embodiment, suitable amphoteric polysaccharides include polysaccharide derivatives containing both a cationic and an anionic substituent. The amphoteric polysaccharides are derivatized or modified to contain a cationic group or substituent. The substituted polysaccharides are formed by the derivatization of the hydroxyl functionality of the polysaccharide. The cationic group may be an amino, ammonium, imino, sulfonium or phosphonium group. Such cationic derivatives include those containing nitrogen containing groups comprising primary, secondary, tertiary and quaternary amines and sulfonium and phosphonium groups attached through either ether or ester linkages. In an embodiment, the cationic derivatives comprise tertiary amino and quaternary ammonium ether groups.

The Degree of Substitution (DS) of cationic polysaccharides is the average number of hydroxyl groups substituted per sugar unit. DS may notably be determined by titration.

According to one aspect of the present disclosure, the DS of the cationic polysaccharides is in the range of 0.1 to 1, preferably, from 0.13 to 1, more preferably, from 0.15 to 1, even more preferably, from 0.16 to 0.3.

The Charge Density (CD) of cationic polysaccharides refers to the ratio of the number of positive charges on a monomeric unit of which a polymer is comprised to the molecular weight of said monomeric unit.

According to one aspect of the present disclosure, the charge density of the cationic polysaccharides is in the range of 0.5 to 3 (meq/gm), preferably, 0.8 to 2 (meq/gm), more preferably, 0.8 to 1.6 (meq/gm), particularly 0.9 to 1.4 (meq/gm).

The cationic polysaccharides may have an average Molecular Weight (Mw) of between about 100,000 daltons and 3,500,000 daltons, preferably between about 500,000 daltons and 3,500,000 daltons, more preferably between 1,500,000 daltons and 3,500,000 daltons.

In an embodiment, the amount of cationic polysaccharide in the composition ranges from about 200 ppm to about 5,000 ppm.

Compositions of the present disclosure further include one or more organic acids. In an embodiment, the organic acid is selected from citric, malic, maleic, oxalic, glutaric, succinic, lactic, glycolic, fumaric, acetic, benzoic, propionic, sorbic, tartaric, formic and mixtures of one or more such organic acids. In another embodiment, the counterion acid may be polymeric acid, such as, for example, poly(acrylic acid) or other polycarboxylic acids (e.g. maleic anhydride, methacrylic acid, etc.) or homopolymers or copolymers (e.g. methyl methacrylate, butyl acrylate, etc.) thereof, such as those in the Rhodoline® series available from Solvay. The composition may include from 500 to 7,000 ppm of one or more organic acids.

In compositions of the present disclosure, the surfactant is selected from cationic surfactants, amphoteric surfactants, and nonionic surfactants.

Cationic surfactants are surfactants that dissolve in water to result in a net cationic charge. In an embodiment, when present, the cationic surfactant is selected from cationic amine oxides, cationic betaines, propionates, amphoacetates and combinations thereof. Amine oxides, propionates, amphoacetates and betaines are cationic in the acidic pH conditions of the present disclosure. In an embodiment, the propionate is selected from cationic C8-C22 propionates and salts thereof. In another embodiment, the cationic C8-C22 propionate is selected from alkyl ampho(di)propionate, alkyl aminopropionates, alkyl amphopropionates, salts thereof, and combinations thereof. In an embodiment the cationic amphoacetate is selected from amphoacetates according to the following formula:

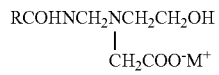

and diamphoacetates according to the following formula:

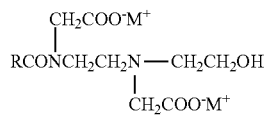

where R is an aliphatic group of 8 to 18 carbon atoms, and M is a cation such as sodium, potassium, ammonium, or substituted ammonium. Sodium lauroamphoacetate, sodium cocoamphoacetate, disodium lauroamphoacetate, and disodium cocoamphodiacetate are preferred in some embodiments.

In an embodiment, the betaine is selected from cationic C8-C22 betaines and salts thereof. In a further embodiment, the cationic C8-C22 betaine is selected from alkyl dimethylbetaines, alkylamidopropyl betaines, alkylampho(di)acetates, salts thereof, and combinations thereof. Where reference is made herein to "salts thereof" for cationic surfactants, these may be any suitable salts. In one embodiment the salt is a salt based on a monovalent cation, such as Na, K, or $NH_4$. In one embodiment, the salt is a salt based on an alkali metal, e.g. Na or K. The use of alternative salts, e.g. alkali earth metal salts such as Ca and Mg could also be contemplated; however the solubility of the product would need to be borne in mind when using such salts.

Amphoteric surfactants contain both a basic and an acidic hydrophilic group and an organic hydrophobic group. In an embodiment, when present, the amphoteric surfactant is selected from sultaines, taurates, and combinations thereof.

A description of nonionic surfactants is given in U.S. Pat. Nos. 4,287,080 and 4,470,923. Mention may in particular be made of condensates of alkylene oxide, in particular of ethylene oxide (linear or branched) and optionally of propylene oxide, with alcohols, polyols, alkylphenols, fatty acid esters, fatty acid amides and fatty amines; amine oxides; sugar derivatives, such as alkylpolyglycosides or esters of fatty acids and of sugars, in particular sucrose monopalmitate; long-chain (of 8 to 28 carbon atoms) tertiary phosphine oxides; dialkyl sulfoxides; block copolymers of polyoxyethylene and of polyoxypropylene; polyalkoxylated esters of sorbitan; fatty esters of sorbitan; poly(ethylene oxide)s and fatty acid amides modified so as to confer thereon a hydrophobic nature (for example, fatty acid mono- and diethanolamides comprising from 10 to 18 carbon atoms).

Typical nonionic surface-active agents by way of example, are:

polyoxyalkylenated $C_8$-$C_{18}$ aliphatic carboxylic acids comprising from 2 to 50 oxyalkylene (oxyethylene and/or oxypropylene) units, in particular of those with 12 (mean) carbon atoms or with 18 (mean) carbon atoms, polyoxyalkylenated $C_6$-$C_{24}$ aliphatic alcohols comprising from 2 to 50 oxyalkylene (oxyethylene and/or oxypropylene) units, in particular of those with 12 (mean) carbon atoms or with 18 (mean) carbon atoms; mention may be made of Antarox® B12DF, Antarox® FM33, Antarox® FM63 and Antarox® V74 from Solvay, Plurafac® LF 400 and Plurafac® LF 220 from BASF, Rhodasurf® ID 060, Rhodasurf® ID 070 and Rhodasurf® LA 42, Rhodasurf® LA 9, Rhodasurf® BC-630 from Solvay and Synperonic® A5, A7 and A9 from ICI, amine oxides, such as dodecyldi(2-hydroxyethyl)amine oxide, phosphine oxides, such as tetradecyldimethylphosphine oxide.

In an embodiment, the nonionic surfactant has a hydrophile-lipophile balance (HLB) value of less than 13. In another embodiment, the nonionic surfactant has an HLB value of less than 12. Nonionic surfactants with different HLB values can be used.

In an embodiment, the composition includes a combination of one or more cationic, amphoteric, and nonionic surfactants.

In an embodiment, compositions of the present disclosure are substantially free of anionic surfactants. With respect to the term "substantially free" we mean that the composition or formulation or component being described contains less than 3% by weight, preferably less than 1%, more preferably 0.1% or less by weight of anionic surfactants.

In addition to the components described herein, the composition may also include a polar carrier solvent (e.g. water), fragrance, preservative, dye, corrosion inhibitor, builder, cleansing solvent and other components known to be useful in antimicrobial compositions.

The compositions according to the present disclosure include both disinfectant cleaning compositions and concentrates which only differ in the relative proportion of water to that of the other constituents. In an embodiment, concentrated formulations include at least one quaternary ammonium compound in an amount ranging from about 800 ppm to about 40,000 ppm; or about 4,000 ppm to about 30,000 ppm; or about 10,000 ppm to about 25,000 ppm; a cationic polysaccharide derived from a natural source in an amount ranging from about 800 ppm to about 30,000 ppm; or about 2,000 ppm to about 25,000 ppm; or about 4,000 ppm to about 20,000 ppm; an organic acid in an amount ranging from about 1,000 ppm to about 35,000 ppm; or about 5,000 ppm to about 25,000 ppm; or about 15,000 ppm to about 25,000 ppm; a surfactant selected from cationic surfactants, amphoteric surfactants and combinations thereof in an amount ranging from about 2,000 ppm to about 90,000 ppm; or about 10,000 ppm to about 75,000 ppm; or about 20,000 ppm to about 70,000 ppm.

The concentrate can be used without dilution (concentrate:water 1:0) to extremely dilute dilutions (e.g., 1:10,000). In an embodiment, a range of dilution is from about 1:1 to about 1:1,000. In another embodiment, a range of dilution is from about 1:1 to about 1:500. In yet another embodiment, a range of dilution is from about 1:10 to about 1:128.

Also disclosed are methods of providing a surface with residual antimicrobial action that includes the step of applying a composition of the present disclosure to the surface.

The composition may be applied to a surface by any method, including methods conducted by hand and methods conducted by machine and combinations thereof. For example, composition may be applied by spraying (pump, aerosol, pressure, etc.), pouring, spreading, metering (for example, with a rod or bar), mopping, wiping, brushing, dipping, mechanical application, other application methods, or combination thereof.

In an embodiment, compositions of the present disclosure are suited for use in a "spray and wipe" application. In such an application, the user generally applies an effective amount of the cleaning composition using the pump and within a few moments thereafter, wipes off the treated area with a rag, towel, or sponge, usually a disposable paper towel or sponge.

Compositions of the present disclosure, whether as described herein or in a concentrate or super concentrate form, can also be applied to a hard surface by using a wet wipe. The wipe can be of a woven or non-woven nature. Fabric substrates can include non-woven or woven pouches, sponges, in the form of abrasive or non-abrasive cleaning pads. Such fabrics are known commercially in this field and are often referred to as wipes. Such substrates can be resin bonded, hydroentangled, thermally bonded, meltblown, needlepunched, or any combination of the former.

The non-woven fabrics may be a combination of wood pulp fibers and textile length synthetic fibers formed by well-known dry-form or wet-lay processes. Synthetic fibers such as rayon, nylon, orlon and polyester as well as blends thereof can be employed. The wood pulp fibers should comprise about 30 to about 60 percent by weight of the non-woven fabric, preferably about 55 to about 60 percent by weight, the remainder being synthetic fibers. The wood pulp fibers provide for absorbency, abrasion and soil retention whereas the synthetic fibers provide for substrate strength and resiliency.

The compositions of the present disclosure are absorbed onto the wipe to form a saturated wipe. The wipe can then be sealed individually in a pouch which can then be opened when needed or a multitude of wipes can be placed in a container for use on an as needed basis. The container, when closed, sufficiently sealed to prevent evaporation of any components from the compositions.

Also provided are substrates with residual antimicrobial action that include a substrate wherein at least a portion of the substrate is coated with a composition of the present disclosure. The formulation of the present disclosure may be put to use by application any substrate. Some suitable substrates include, for example, countertops, mirrors, sinks, toilets, light switches, doorknobs, walls, floors, ceilings, partitions, railings, computer screens, keyboards, instruments, etc. Suitable substrates may be found in various settings including, for example, food preparation areas, households, industrial settings, architectural settings, medical settings, sinks, toilets, etc. Substrates may be made of any material; some suitable substrate compositions include, for example, plastic (including, for example, laminates and wall coverings), Formica, metal, glass, ceramic tile, paper (such as, for example, wallpaper), fabric, finished or unfinished wood, etc.

Also provided is the use of a composition of the present disclosure to substantially reduce or control the formation of microbial colonies on or at a surface. In an embodiment, a film formed from the composition kills at least 95% of microorganisms for at least 3 abrasion cycles according to RSS-12 h. In another embodiment, a film formed from the composition kills at least 95% of microorganisms according to Environmental Protection Agency (EPA) Protocol #01-1A residual self-sanitizing activity test (e.g. 6 abrasion cycles for a 24 hour claim). In an embodiment, a film formed from the composition kills at least 95% of microorganisms according to BSI-PAS 2424. In another embodiment, a film formed from the composition kills at least 99.9% of microorganisms for at least 3 abrasion cycles according to RSS-12 h. In yet another embodiment, a film formed from the composition kills at least 99.9% of microorganisms according to Environmental Protection Agency (EPA) Protocol #01-1A residual self-sanitizing activity test (e.g. 6 abrasion cycles for a 24 hour claim). In another embodiment, a film formed from the composition kills at least 99.9% of microorganisms according to BSI-PAS 2424.

In an embodiment, a film formed from the composition kills at least 95% of gram-positive bacteria and gram-negative bacteria, fungi, or enveloped and non-enveloped viruses for at least 3 abrasion cycles according to RSS-12 h. In another embodiment, a film formed from the composition kills at least 95% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles for a 24 hour claim). In another embodiment, a film formed from the composition kills at least 99.9% of gram-positive bacteria and gram-negative bacteria, fungi, or enveloped and non-enveloped viruses for at least 3 abrasion cycles according to RSS-12 h. In yet another embodiment, a film formed from the composition kills at least 99.9% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles for a 24 hour claim).

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting.

Example 1. Evaluation of Film Residual Biocidal Activity: BSI-PAS2424 Protocol Films prepared from Formulations A and B (Table 1) were evaluated using BSI-PAS2424 protocol as described above.

TABLE 1

| Components (actives) | A (wt %) | B (comparative) (wt %) |
|---|---|---|
| Cationic guar | 0.3 | — |
| Synthetic copolymer | — | 0.3 |
| An antimicrobial component comprising at least one quaternary ammonium compound | 0.7 | 0.7 |
| Sodium carbonate | 0.36 | 0.36 |
| Sodium bicarbonate | 0.1 | 0.1 |
| Amine oxide | 0.81 | 0.81 |
| C9-11 alcohol ethoxylate | 0.5 | 0.5 |
| Dipropylene glycol monoethyl ether | 0.5 | 0.5 |
| Isopropyl alcohol | 0.6 | 0.6 |
| Water | Complete to 100 | Complete to 100 |
| Test Microorganism | Pseudomonas aeruginosa (NCTC 13359) | |
| Test Substrate | Stainless steel discs | Stainless steel discs |
| Log Reduction | >3 | <2.4 |
| Replicates | 5 replicates; all complete kill | 5 replicates; too numerous to count |

Example 2. The Effect of Nonionic Surfactant on Film Spreading was Investigated on Polycarbonate Surfaces A composition (Formulation C) with improved wetting is shown below in Table 2.

TABLE 2

Formula C

| Components (actives) | C (wt %) |
|---|---|
| Cationic guar | 0.3 |
| An antimicrobial component comprising at least one quaternary ammonium compound | 0.7 |
| Sodium carbonate | 0.36 |
| Sodium bicarbonate | 0.1 |
| Amine oxide | 0.81 |
| Tridecyl alcohol ethoxylate | 0.5 |
| Dipropylene glycol monoethyl ether | 0.5 |

TABLE 2-continued

Formula C

| Components (actives) | C (wt %) |
|---|---|
| Isopropyl alcohol | 0.6 |
| Water | Complete to 100 |

100 microliter aliquots of Formula A and Formula C were spread evenly over a polycarbonate (1 inch×1 inch) substrate and imaged at 10 second intervals. The liquid Formula A started dewetting immediately, withdrawing to a liquid pool, while Formula C liquid film substantially stays static and covers the entire substrate, dewetting marginally from the corners.

Formula A (wetting at 5 minutes)<50% surface area.
Formula C (wetting at 5 minutes)>90% surface area.

The liquid films dried to form residual uniformly spread films on the surface with greater coverage and were later employed for testing with the more rigorous RSS-12 h test for biocidal activity.

Example 3. Evaluation of Film Residual Biocidal Activity: EPA Protocol

Films prepared from Formula C were evaluated using RSS-12 h protocol as described above, a modified version the residual self-sanitization (RSS) method, EPA Protocol #01-1A. Protocol #01-1A is a method approved by the EPA for measuring long-term sanitization claims (i.e., "kill later" durability claim). Protocol #01-1A, the entire contents of which are incorporated by reference, measures the residual self-sanitizing activity of dried chemical residues (films) on inanimate, hard, non-porous surfaces against bacteria: Staphylococcus aureus, Klebsiella pneumoniae, and/or Enterobacter aerogenes. In particular, surfaces are inoculated, treated with test product, allowed to dry, then abraded under alternating wet and dry conditions, which are interspersed with several re-inoculations. (FIG. 1).

The test shown in Table 3 was conducted on a steel substrate (1 inch×1 inch) with Enterobacter aerogenes, a gram negative bacteria which is typically more resistant. It was carried out in triplicate with Formula C (1-3) with the surfactant Triton X-100 (1-3) as control. The initial, intermediate (24 h), and final inoculum strength is shown with the surviving microbial population at the end of the final inoculation shown as plate count, cfu/ml (colony forming units/mililiter). All the films were prepared by pipetting 150 microliters of Formula C and allowed to air dry. Formula C when applied to the steel surface on average provides >3 log reduction in bacterial population or >99.9% kill. The passing threshold as outlined in a typical surface sanitization test and as outlined in RSS-12 h above is 3 log reduction.

TABLE 3

Formula C on stainless steel with E. aerogenes.

| Carrier | avg. cfu/ surface | Log | geom. mean | Avg. cfu/ carrier | % reduction vs. control | log reduction vs. control |
|---|---|---|---|---|---|---|
| Triton X-100 (Samples 1-3) | 3.00E+06 | 6.48 | 6.48 | 3.00E+06 | N/A | |
| Formula C (Samples 1-3) | 3.00E+01 | 1.48 | 1.48 | 3.00E+01 | >99.9 | >3 |
| Initial Inoculum | 4.80 logs | | Incubated jars for 24 hours, | | | |
| 24-hr Inoculum | 7.26 logs | | all Formula C samples were | | | |
| Final Inoculum | 7.28 logs | | observed to have no turbidity. | | | |

Example 4. RSS-12 and Effect of Reduced "Quat" Content

The disinfectant Formula C appears to be fairly robust in providing >3 LR even with reduced volumes for treatment. This was further adapted to reduce the total biocide "quat" concentration while keeping all the other components constant. The total "quat" is the sum of ppm of typical "quats", such that the amount was dramatically reduced from 0.7% w/w (7000 ppm) in Formula C to 200 ppm, 500 ppm, and 1000 ppm. All the films were prepared by pipetting 150 microliters of the formulations on a (1×1) inch steel substrate and allowed to air dry. These modified compositions were tested with *Enterobacter aerogenes* on steel substrates as shown in Table 4 and passed the RSS-12 protocol with >3 LR as required.

TABLE 4

Modified Formula C with different amounts of "quat" (150 microliters) on stainless steel with *Entero. aerogenes*.

| Carrier | Avg. cfu/carrier | Log | % reduction vs. control | log reduction vs. control |
|---|---|---|---|---|
| Triton X-100 (Samples 1-4) | 1.29E+06 | 6.11 | N/A | |
| Formula C modified (200 ppm quat) | 3.00E+01 | 1.48 | >99.9 | >4 |
| Formula C modified (500 ppm quat) | 3.00E+01 | 1.48 | >99.9 | >4 |
| Formula C modified (1000 ppm quat) | 9.93E+01 | 1.99 | >99.9 | >4 |
| Initial Inoculum | 3.85 logs | Incubated jars for 24 hours, all Formula C samples were observed to have no turbidity. | | |
| 24-hr Inoculum | 4.76 logs | | | |
| Final Inoculum | 8.39 logs | | | |

Example 5. Testing for RSS-24

Formula C was then further evaluated by (EPA) Protocol #01-1A residual self-sanitizing activity test with 6 alternating abrasion cycles (wet and dry each) for a 24 hour claim. This test (designated RSS-24) is more aggressive than RSS-12 with twice the number of wet and dry abrasions and also involves 5 re-inoculations instead of 3 for RSS-12. Care has to be taken that the % relative humidity (% RH) is within the test range of (45-55)%. When evaluated with 150 microliters of Formula C on a (1×1) steel substrate with *Enterobacter aerogenes*, >3 LR were achieved as required by the test (Table 5), indicating a pass for RSS-24.

TABLE 5

RSS-24 for Formula C (150 microliters) on stainless steel with *Entero. aerogenes*.

| Carrier | Avg. cfu/carrier | Log | % reduction vs. control | log reduction vs. control |
|---|---|---|---|---|
| Triton X-100 (Samples 1-3) | 1.85E+07 | 7.27 | N/A | |
| Formula C (Samples 1-4) | 6.34E+01 | 1.8 | >99.999 | >5 |
| Initial Inoculum | 2.9E+06 | Incubated jars for 24 hours, 3 of 4 Formula C samples were observed to have no turbidity. | | |
| 24-hr Inoculum | 2.9E+06 | | | |
| Final Inoculum | 1.6E+08 | | | |

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

What is claimed is:

1. A liquid hard surface treatment composition comprising:
   a. an antimicrobial component comprising at least one quaternary ammonium compound in an amount ranging from about 100 ppm to about 20,000 ppm;
   b. a cationic polysaccharide derived from a natural source in an amount ranging from about 200 ppm to about 5,000 ppm;
   c. an organic acid from about 500 ppm to about 7,000 ppm; and
   d. a surfactant selected from the group consisting of cationic surfactants, amphoteric surfactants, nonionic surfactants, and combinations thereof,
   wherein a film formed from the composition kills at least 95% of microorganisms for at least 3 abrasion cycles according to RSS-12 h.

2. The composition of claim 1, wherein the antimicrobial component is selected from the group consisting of monoalkyldimethylbenzyl ammonium salts, dialkyldimethyl ammonium salts, and combinations thereof.

3. The composition of claim 1, wherein the cationic polysaccharide is selected from the group consisting of cationic guar, cationic cellulose, cationic starch, and combinations thereof.

4. The composition of claim 3, wherein the cationic polysaccharide is cationic guar.

5. The composition of claim 4, wherein the cationic guar is selected from the group consisting of guars hydroxypropyltrimonium chloride, hydroxypropyl guar hydroxypropyltrimonium chloride, and combinations thereof.

6. The composition of claim 1, wherein the organic acid is selected from the group consisting of citric, malic, maleic, lactic, succinic, glutaric, adipic acids and combinations thereof.

7. The composition of claim 1, wherein the surfactant comprises a cationic surfactant selected from the group consisting of cationic amine oxides, cationic betaines, propionates, amphoacetates and combinations thereof.

8. The composition of claim 1, wherein the surfactant comprises an amphoteric surfactant selected from the group consisting of sultaines, taurates, and combinations thereof.

9. The composition of claim 1 further comprising a polar solvent.

10. The composition of claim 1, wherein a film formed from the composition kills at least 95% of gram-positive bacteria and gram-negative bacteria, or enveloped and non-enveloped viruses according to Environmental Protection Agency (EPA) Protocol #01-1A residual self-sanitizing activity test.

11. A liquid hard surface treatment concentrate composition comprising:

a. an antimicrobial component comprising at least one quaternary ammonium compound in an amount ranging from 800 ppm to about 40,000 ppm;

b. a cationic polysaccharide derived from a natural source in an amount ranging from about 800 ppm to about 30,000 ppm;

c. an organic acid in an amount ranging from about 1,000 ppm to about 35,000 ppm; and d. a surfactant selected from the group consisting of cationic surfactants, amphoteric surfactants, nonionic surfactants, and combinations thereof in an amount ranging from about 2,000 ppm to about 90,000 ppm, wherein the concentrate composition or a diluted solution of the concentrate composition forms a film that kills at least 95% of microorganisms for at least 3 abrasion cycles according to RSS-12 h.

12. A method of providing a surface with residual antimicrobial action that comprises the step of applying the composition of claim 1 to the surface.

13. A substrate with residual antimicrobial action comprising a substrate wherein at least a portion of the substrate is coated with the composition of claim 1.

14. The composition of claim 1 further comprising water.

* * * * *